Figure 1:
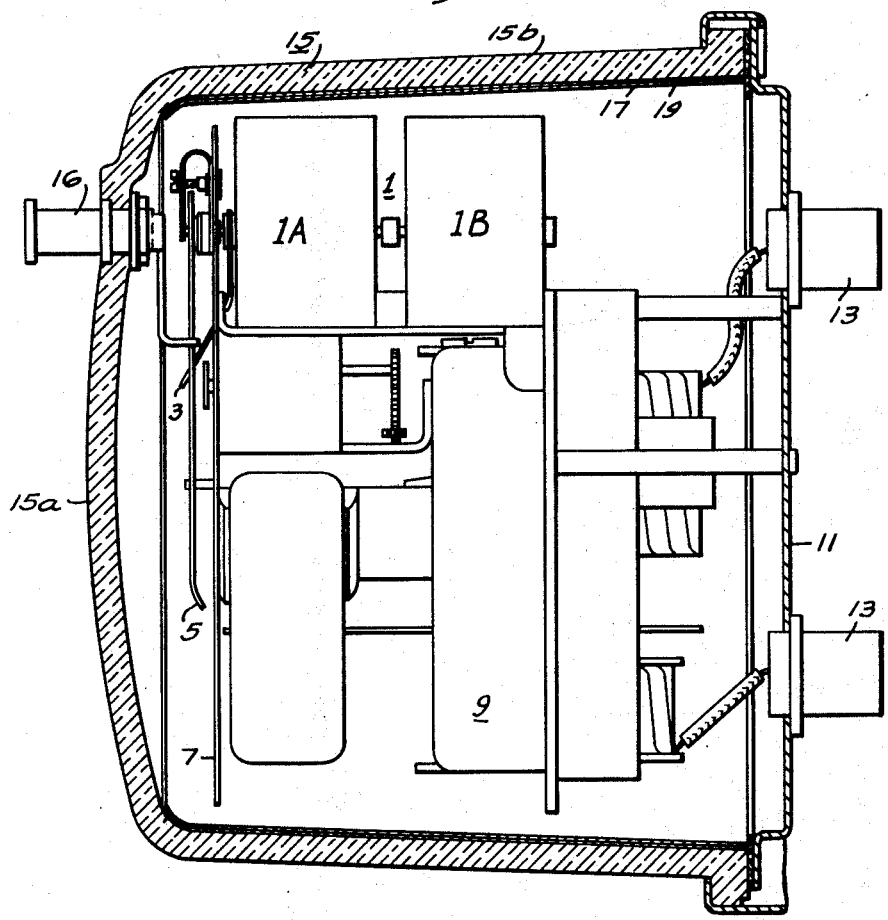

Patented July 28, 1953

2,647,235

UNITED STATES PATENT OFFICE 2,647,235

THERMO-RESPONSIVE MEASURING DEVICE

Cornelius Hogenbirk, East Orange, N. J., assignor to Westinghouse Electric Corporation, East Pittsburgh, Pa., a corporation of Pennsylvania Application October 30, 1947, Serial No. 783,102

11 Claims. (Cl. 324—105)

This invention relates to devices subject to errors resulting from reception of radiation from external sources of energy, and it has particular relation to a measuring device wherein a thermo-responsive movement is disposed in a casing which includes a cup-shaped glass cover.

Although thermo-responsive measuring devices, generally, are compensated for variations in ambient temperature, they are still subject to errors resulting from heat received from external sources, particularly if the heat is not uniformly distributed over the movement. As examples of external sources which may result in inaccuracy of the thermo-responsive measuring device, reference may be made to radiation from the sun and to heat received from local heat sources.

That this is a serious problem is shown by the fact that the prior art has attempted to eliminate this source of error by enclosing the thermo-responsive movement in a metallic box or casing. The thermal conductivity of the metallic box was intended to distribute heat uniformly over the movement. It should be noted that the metallic box represents an additional element which requires special mounting facilities and which may interfere with servicing of the movement.

In accordance with the invention, a thermo-responsive movement disposed in a casing comprising a conventional cup-shaped glass cover is protected from sources of external heat by means of a layer of metal which engages the interior surface of a portion of the glass cover. This metal preferably is selected to provide a mirror surface for reflecting radiation received from external heat sources. In addition the layer of metal has high opacity for preventing penetration of radiation therethrough. The metal layer also may be employed to protect movements from other forms of radiant energy, such as light, if the movement is subject to errors resulting from reception of such radiation. By selecting a metal having good thermal conductivity, heat generated by the small portion of radiation which is not reflected tends to be uniformly distributed over the entire surface of the metal layer. Preferably, the metallic layer is formed by evaporating metal directly against the desired interior surface of the cover. In this way the cover supports the metallic layer and protects it from damage.

It is therefore an object of the invention to provide a thermo-responsive device having an improved casing.

It is a further object of the invention to provide a casing for a thermo-responsive device which is lined in part with a metal having good reflectivity properties.

It is an additional object of the invention to provide a cup-shaped glass cover for a thermo-responsive device having a layer of evaporated metal on the interior surface of the side wall of the cover to provide a mirror surface in direct engagement with the glass cover.

Figure 2:
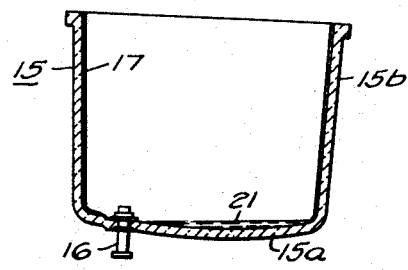

Other objects of the invention will be apparent from the following description taken in conjunction with the accompanying drawing, in which:

Figure 1 is a sectional view in elevation of a measuring device embodying the invention, and Fig. 2 is a sectional view in elevation of a meter cover embodying the invention.

Referring to the drawing, Fig. 1 shows a ther-moresponsive measuring device which may take the form of a thermal demand meter 1. This thermal demand meter includes a pusher arm 3 for rotating a maximum demand pointer 5 across a suitable scale plate 7. Conveniently, the thermal demand meter 1 may be mounted on a watt-hour meter 9 which in turn is secured to a base plate 11. The base plate 11 has suitable terminals, such as contact blades 13, which may be introduced into contact jaws of a conventional meter socket (not shown) for establishing connections between the meters 1 and 9 and an external electrical circuit. The base plate 11 closes the opening in a cup or bell shaped glass cover 15. This glass cover has an end wall 15a through which the scale of the thermal demand meter 1 and the register of the watthour meter 9 may be inspected. The end wall supports resetting mechanism 16 for the maximum demand pointer 5. The cover 15 also has a generally cylindrical side wall 15b. The parts of the single figure which thus far have been specifically mentioned may be similar to the corresponding parts shown in the Vassar Patent No. 2,323,738. Thus the thermal demand meter includes a movement divided into two sections 1A and 1B which are heated to different temperatures in accordance with the vector sum and difference of voltage and current of an associated electrical circuit to control movement of the pusher arm 3 as clearly set forth in the Vassar patent.

In order to protect the thermal demand meter 1 from external sources of heat, a layer of metal 17 in the form of a shell is positioned in engagement with the interior surface of the side wall 15b. The metal layer is not extended over the end wall 15a to any substantial extent for the reason that the register of the watthour meter and the scale of the thermal demand meter are read through the end wall.

Preferably, the metal layer 17 is formed by evaporating metal directly into adherent engagement with the desired interior surface of the glass cover 15. Metal reaching the end wall 15a may be removed by abrasion, or the interior surface of the end wall 15 may be protected by a suitable mask prior to the application of the metal.

Methods for depositing evaporated metal on desired surfaces of the glass are well known in the art. According to one such method, air within the cover is evacuated and a strip of aluminum foil then is atomized within the resulting evacuated space to deposit a layer of aluminum on the inner surface of the cover.

The deposition of metal directly against the side wall 15b produces a highly efficient mirror surface in contact with the side wall which reflects a large proportion of radiation reaching the measuring device from an external source of heat. Furthermore, the metal layer 17 is on the interior surface of the glass cover and consequently is protected from damage. Metals providing an efficient mirror surface, such as aluminum, copper or silver, may be employed. Since aluminum, copper and silver have high thermal conductivity, it follows that any heat produced by radiation which is not reflected from the metal layer 17 tends to be distributed substantially uniformly throughout the metal layer. In addition, it may be pointed out that the metal layer 17 has high opacity and tends to prevent any radiation from reaching the thermal demand meter 1. For these reasons the thermal demand meter does not have portions subject to temperature differences resulting from radiation received from an external source of heat. In practice it has been found that an extremely thin layer of metal, such as aluminum, provides effective protection for a thermal demand meter. However, thicker layers may be employed if greater thermal conduction is desired.

Inasmuch as the layer 17 is supported directly by the cover 15, no special mounting facilities and no special manufacturing techniques are required for assembling the cover 15 and the base plate 11 to form a housing or casing for the material.

If desired, a protective coating 19 in the form of a shell may be applied over the inner surface of the layer 17. For example, a suitable paint such as a black baking lacquer may be employed for the protective coating 19. The coating not only provides additional mechanical protection, but also tends to absorb internal heat at all points around the circumference of the cover. This heat is transferred to the layer 17. Since the layer 17 has good thermal conductivity it cooperates with the black coating to equalize efficiently the temperature within the cover 15.

In Fig. 2 an additional method is illustrated for removing the metal layer 17 from the end wall 15a. As shown in Fig. 2, an etching fluid or solvent 21 for the metal layer is introduced into the interior of the cover 15. By tilting the cover, the solvent may be directed against the desired portion of the metal layer 17. For example, in Fig. 2, the cover is tilted to leave intact the metal layer on the top of the end wall (adjacent the resetting mechanism 16) and to remove the metal from the bottom of the end wall and from an adjacent portion of the side wall 15b. Any conventional solvent may be employed. For example, nitric acid or hot sulfuric acid is effective for silver and copper. Hydrochloric acid, sulfuric acid, and alkali solutions such as sodium hydroxide and potassium hydroxide are suitable for aluminum.

Although the invention has been described with reference to certain specific embodiments thereof, numerous modifications are possible. Consequently, the appended claims have been drafted to cover all modifications falling within the spirit and scope of the invention.

I claim as my invention:

1. In a thermal measuring device, a thermoresponsive electrical movement having spaced components which may be heated to different temperatures, said thermoresponsive electrical movement having a response affected by the distribution of radiant energy received by said components, a casing for the movement comprising a base member and a cup-shaped glass cover having a side wall and an end wall, said glass cover forming with the base member an enclosure for the movement, and a substantially opaque and continuous layer of metal secured to the interior surface of the side wall of the glass cover, said layer of metal extending substantially around said components to protect said thermoresponsive movement from radiant energy reaching the thermal measuring device from an external source, said end wall being light-permeable for permitting inspection therethrough of a portion of said movement.

2. A device as claimed in claim 1 wherein said layer is formed of a metal having a high coefficient of thermal conductivity, said metal having a mirror surface directly adhering to said side wall.

3. A device as claimed in claim 2 wherein said metal comprises evaporated aluminum.

4. A device as claimed in claim 2 wherein the metal comprises silver.

5. A device as claimed in claim 2 wherein the metal comprises copper.

6. In a thermal measuring device, a thermoresponsive electrical movement, a casing for the movement comprising a base member and a light-permeable cover having an inspection portion and a non-inspection portion, said glass cover forming with the base member an enclosure for the movement, said movement including an indicating device positioned adjacent the inspection portion for inspection through the inspection portion, and said movement including spaced components which may be heated to different temperatures for operating said indicating device, said movement being sensitive to the distribution of radiant energy reaching the components for undesirably affecting the operation of the indicating device, and a substantially opaque layer of metal positioned within the enclosure in engagement with and secured to said non-inspection portion and terminating short of said inspection portion, said metal having substantial thermal conductivity said non-inspection portion and the metal layer extending substantially around said components to intercept radiant energy reaching the thermal measuring device.

7. A thermal measuring device as claimed in claim 6 wherein said layer of metal has a mirror surface adhering to said non-inspection portion.

8. A thermal measuring device as claimed in claim 7 wherein the cover is a cup-shaped glass cover, said inspection portion comprising the end wall and said non-inspection portion comprising the side wall of the cup-shaped glass cover.

9. A protector for a thermal measuring device including a thermo-responsive movement and a base having a register mechanism thereon enclosed within a glass bell secured to the base, said protector comprising first and second shells snugly fitting said bell, said first shell directly adhering to said bell and being composed of a metal having thermal conductivity and reflectivity of the order of that of aluminum to be effective to reflect radiations emanating from external sources of heat and to distribute substantially uniformly about said thermo-responsive movement heat effected by non-reflected radiations, said second shell directly adhering to said first shell and being composed of a heat-absorbing material to be effective to absorb heat within said bell adjacent said second shell and to transfer such heat to said first shell to thereby cause such heat to be distributed substantially uniformly about said thermo-responsive movement.

10. In a thermal measuring device, a thermo-responsive electrical movement, a casing for the movement comprising a base member and a cup-shaped glass cover having a side wall and an end wall, said glass cover forming with the base member an enclosure for the movement, a substantially opaque and continuous layer of metal secured to the interior surface of the side wall of the glass cover, said metal having a high coefficient of thermal conductivity and having a mirror surface directly adhering to said side wall, and a layer of heat-absorbing material adhering to said layer of metal, said end wall being light-permeable for permitting inspection therethrough of a portion of said movement.

11. In a thermal measuring device, a thermo-responsive electrical movement, a casing for the movement comprising a base member and a light-permeable cover having an inspection portion and a non-inspection portion, said glass cover forming with the base member an enclosure for the movement, said movement including an indicating device positioned adjacent the inspection portion for inspection through the inspection portion, and said movement including thermally responsive mechanism for operating said indicating device, a substantially opaque layer of metal having substantial thermal conductivity positioned within the enclosure in engagement with and secured to said non-inspection portion and terminating short of said inspection portion, and a protective layer of heat-absorbing baking lacquer directly adhering to said layer of metal.

CORNELIUS HOGENBIRK.

References Cited in the file of this patent

UNITED STATES PATENTS

| Number | Name | Date |
|---|---|---|
| 546,802 | Ayrton et al. | Sept. 24, 1895 |
| 1,005,087 | Van Wye | Oct. 3, 1911 |
| 1,631,684 | Hoyle | June 7, 1927 |
| 1,992,535 | Lincoln | Feb. 26, 1935 |
| 2,121,667 | Kittredge et al. | June 21, 1938 |
| 2,128,277 | Young et al. | Aug. 30, 1938 |
| 2,212,730 | Downing | Aug. 27, 1940 |
| 2,366,292 | Smith | Jan. 2, 1945 |
| 2,575,715 | Keller | Nov. 20, 1951 |

FOREIGN PATENTS

| Number | Country | Date |
|---|---|---|
| 455,923 | Great Britain | Oct. 27, 1936 |